US007523095B2

(12) United States Patent
Gates et al.

(10) Patent No.: US 7,523,095 B2
(45) Date of Patent: Apr. 21, 2009

(54) SYSTEM AND METHOD FOR GENERATING REFINEMENT CATEGORIES FOR A SET OF SEARCH RESULTS

(75) Inventors: Stephen C. Gates, Redding, CT (US); Alexander W. Holt, Mount Kisco, NY (US); Michael E. Moran, Ridgewood, NJ (US); Pat Velderman, Westfield, NJ (US)

(73) Assignee: International Business Machines Corporation, Armonk, NY (US)

( * ) Notice: Subject to any disclaimer, the term of this patent is extended or adjusted under 35 U.S.C. 154(b) by 443 days.

(21) Appl. No.: 10/426,166

(22) Filed: Apr. 29, 2003

(65) Prior Publication Data

US 2004/0220902 A1     Nov. 4, 2004

(51) Int. Cl.
*G06F 17/30* (2006.01)
(52) U.S. Cl. ............................. 707/3; 707/5
(58) Field of Classification Search ............ 707/1, 707/100, 3, 5
See application file for complete search history.

(56) References Cited

U.S. PATENT DOCUMENTS

| 5,201,047 | A | | 4/1993 | Maki et al. |
| 5,706,497 | A | | 1/1998 | Takahashi et al. |
| 5,857,185 | A | | 1/1999 | Yamaura |
| 5,924,090 | A | * | 7/1999 | Krellenstein ................ 707/5 |
| 5,969,283 | A | * | 10/1999 | Looney et al. ............ 84/609 |
| 5,987,457 | A | | 11/1999 | Ballard |
| 6,014,662 | A | | 1/2000 | Moran et al. |
| 6,025,843 | A | | 2/2000 | Sklar |
| 6,028,605 | A | | 2/2000 | Conrad et al. |
| 6,175,830 | B1 | | 1/2001 | Maynard |
| 6,223,145 | B1 | | 4/2001 | Hearst |
| 6,226,620 | B1 | | 5/2001 | Oon |
| 6,226,630 | B1 | | 5/2001 | Billmers |
| 6,272,507 | B1 | | 8/2001 | Pirolli et al. |

(Continued)

FOREIGN PATENT DOCUMENTS

JP         11-306187         11/1999

(Continued)

OTHER PUBLICATIONS

Yahoo Web Site. (c) 2002. Retrieved from http://www.archive.org. 6 pages.*

(Continued)

*Primary Examiner*—Apu M Mofiz
*Assistant Examiner*—Charles E Lu
(74) *Attorney, Agent, or Firm*—Norman Gundel Hoffman Warnick LLC

(57) ABSTRACT

A system for enhancing search results generated in response to a search query. The system comprises: a category identifier system that analyzes each search result and identifies at least one category from a hierarchy of categories for each search result, thereby providing a list of identified categories; a ranking system that ranks each category in the list of identified categories; and a selection system that selects a predetermined number of the highest ranking categories from the list of identified categories to generate the set of refinement categories, wherein the selection system eliminates categories from the set of refinement categories if the category has a parent in the set of refinement categories.

8 Claims, 2 Drawing Sheets

U.S. PATENT DOCUMENTS

| | | | |
|---|---|---|---|
| 6,297,824 B1 | 10/2001 | Hearst et al. | |
| 6,324,534 B1 | 11/2001 | Neal et al. | |
| 6,363,377 B1 | 3/2002 | Kravets et al. | |
| 6,366,910 B1* | 4/2002 | Rajaraman et al. | 707/5 |
| 6,385,602 B1* | 5/2002 | Tso et al. | 707/3 |
| 6,434,548 B1 | 8/2002 | Emens et al. | |
| 6,484,166 B1* | 11/2002 | Maynard | 707/5 |
| 6,631,496 B1* | 10/2003 | Li et al. | 715/501.1 |
| 6,868,525 B1* | 3/2005 | Szabo | 715/738 |

FOREIGN PATENT DOCUMENTS

| | | |
|---|---|---|
| WO | WO 01/71507 A1 | 9/2001 |
| WO | WO 01/75728 A1 | 10/2001 |
| WO | WO 02/13064 A2 | 2/2002 |

OTHER PUBLICATIONS

Kerschberg et al. "A Personalizable Agent for Semantic Taxonomy-Based Web Search." WRAC 2002, LNAI 2564, pp. 3-31, 2003.*

Eichmann, David. "Ontology-Based Information Fusion." School of Library and Information Science, University of Iowa. 10 pages.*

Tanudjaja et al. "Persona: A Contextualized and Personalized Web Search." Proceedings or the 35th Hawaii International Conference on System Sciences, 2002. 9 pages.*

Liu et al. "Personalized Web Search by Mapping User Queries to Categories." CIEM '02, pp. 558-565. © 2002 ACM.*

Dunnais et al. "Optimizing Search by Showing Results in Context." CHI 2001, vol. 3, No. 1, pp. 277-284.*

Stojanovic et al. "An Approach for Step-By-Step Query Refinement in the Ontology-based Information Retrieval." WI '04, 8 pages.*

Shneiderman et al., "Visualizing Digital Library Search Results with Categorical and Hierarchical Axes", ACM 2000, pp. 57-65.

IBM Research Disclosure No. 41392, "Virtual URLs For Browsing and Searching Large Information Spaces", Sep. 1998, pp. 1238-1239.

Marshall, A., "Cluster-based Search and Replace", Internet Article, Online!, Dec. 10, 2002, Retreived from http://graphics.csail.mit.edu/{alisa_m/meng/proposal/proposal-final12.pdf, pp. 1-7.

* cited by examiner

SYSTEM AND METHOD FOR GENERATING REFINEMENT CATEGORIES FOR A SET OF SEARCH RESULTS

BACKGROUND OF THE INVENTION

1. Technical Field

The present invention relates generally to categorizing search results, and more specifically relates to a system and method for generating refinement categories for a set of search results.

2. Related Art

With the explosive growth of distributed networks, such the Internet and World Wide Web, the ability to effectively search for electronic information has become more and more important. Most web-based search engines, such as GOOGLE®, allow a user to enter a query comprised of key words to search for relevant documents. Unfortunately, a typical key word search will often generate a return set comprised of tens or hundreds of thousands of "hits," i.e., links to web pages that include the key words. Although most search engines attempt to display the most relevant documents first, there is no guarantee that the algorithm used by the search engine will identify the most relevant results for the user.

One way to address the problem is to provide a mechanism that allows the user to further narrow the return set. For instance, in U.S. Pat. No. 5,924,090, Method and Apparatus for Searching a Database of Records, issued on Jul. 13, 1999 to Krellenstein, which is hereby incorporated by reference, search results are organized into a manageable set (e.g., 8-10) of hierarchical categories according to various metadata attributes. The user can then refine the search results by selecting a category. Unfortunately, in the above patent, the methodology for generating categories for the end user has certain limitations. In particular, the categories are selected using a weighted scoring algorithm that often causes a child (or grandchild) category to be displayed along side its parent category. For instance, a search for the term "disk drive" may turn up the parent category "Hardware" along with the child category "Personal Computers," and grandchild category "PC Peripherals." Such a result may not help the user narrow down the search results, as several categories may still have to be traversed by the user to find the best results.

Accordingly, a need exists for a system and method that can more effectively provide refinement categories in response to queries submitted to a search engine.

SUMMARY OF THE INVENTION

The present invention addresses the above-mentioned problems, as well as others, by providing a system and method for generating "refinement" categories for a set of search results in a return set. In a first aspect, the invention provides a method for generating a set of refinement categories in response to a search query, comprising: generating a set of search results in response to a query; identifying at least one category from a hierarchy of categories for each search result; rank-ordering each identified category based on a number of times the category was identified for the set of search results; selecting an initial set of refinement categories based on the rank-ordering of the identified categories; eliminating all categories from the initial set of refinement categories that meet an elimination criterion; and displaying a resulting set of refinement categories.

In a second aspect, the invention provides a system for providing a set of refinement categories for a set of search results generated in response to a search query, comprising: a category identifier system that analyzes each search result and identifies at least one category from a hierarchy of categories for each search result, thereby providing a list of identified categories; a ranking system that ranks each category in the list of identified categories; and a selection system that selects a predetermined number of the highest ranking categories from the list of identified categories to generate the set of refinement categories, wherein the selection system eliminates categories from the set of refinement categories if the category has a parent in the set of refinement categories.

In a third aspect, the invention provides a program product stored on a recordable medium for providing a set of refinement categories for a set of search results generated in response to a search query, comprising: means for identifying at least one category from a hierarchy of categories for each search result, thereby providing a list of identified categories; means for ranking each category in the list of identified categories; means for selecting the set of refinement categories from the list of identified categories by using a predetermined number of the highest ranking categories as determined by the ranking means; and means for eliminating categories from the set of refinement categories if the category has a hierarchical ancestor in the set of refinement categories.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
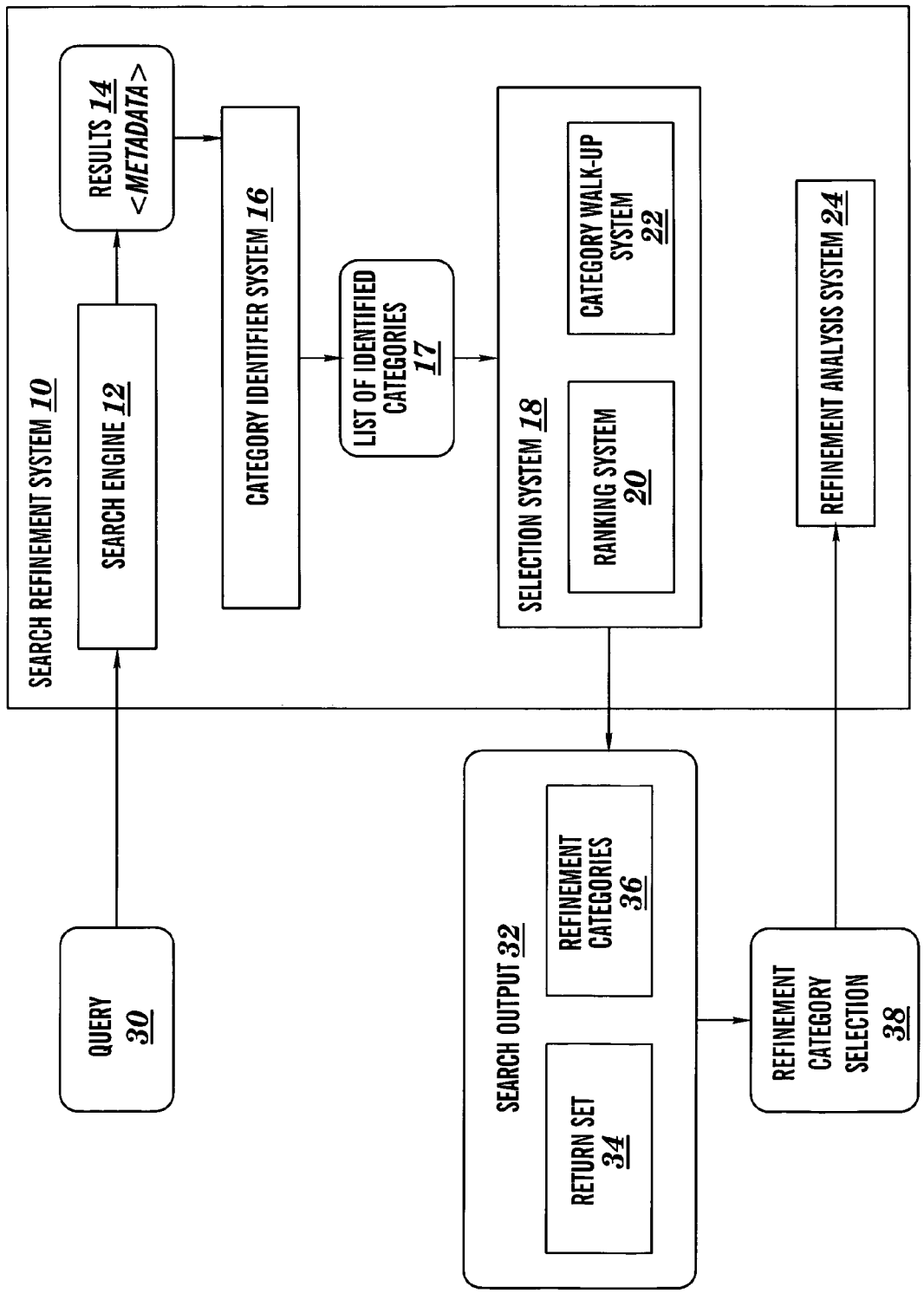
FIG. 1 depicts a search refinement system in accordance with the present invention.

Referring now to the drawings, FIG. 1 depicts a search refinement system 10 that accepts a search query 30 and returns search output 32 comprised of a return set 34 (i.e., a list of located documents) and a set of refinement categories 36. If the user needs to narrow the scope the search, a refinement category selection 38 can be submitted to the search refinement system 10 to refine the original query 30.

Figure 2:
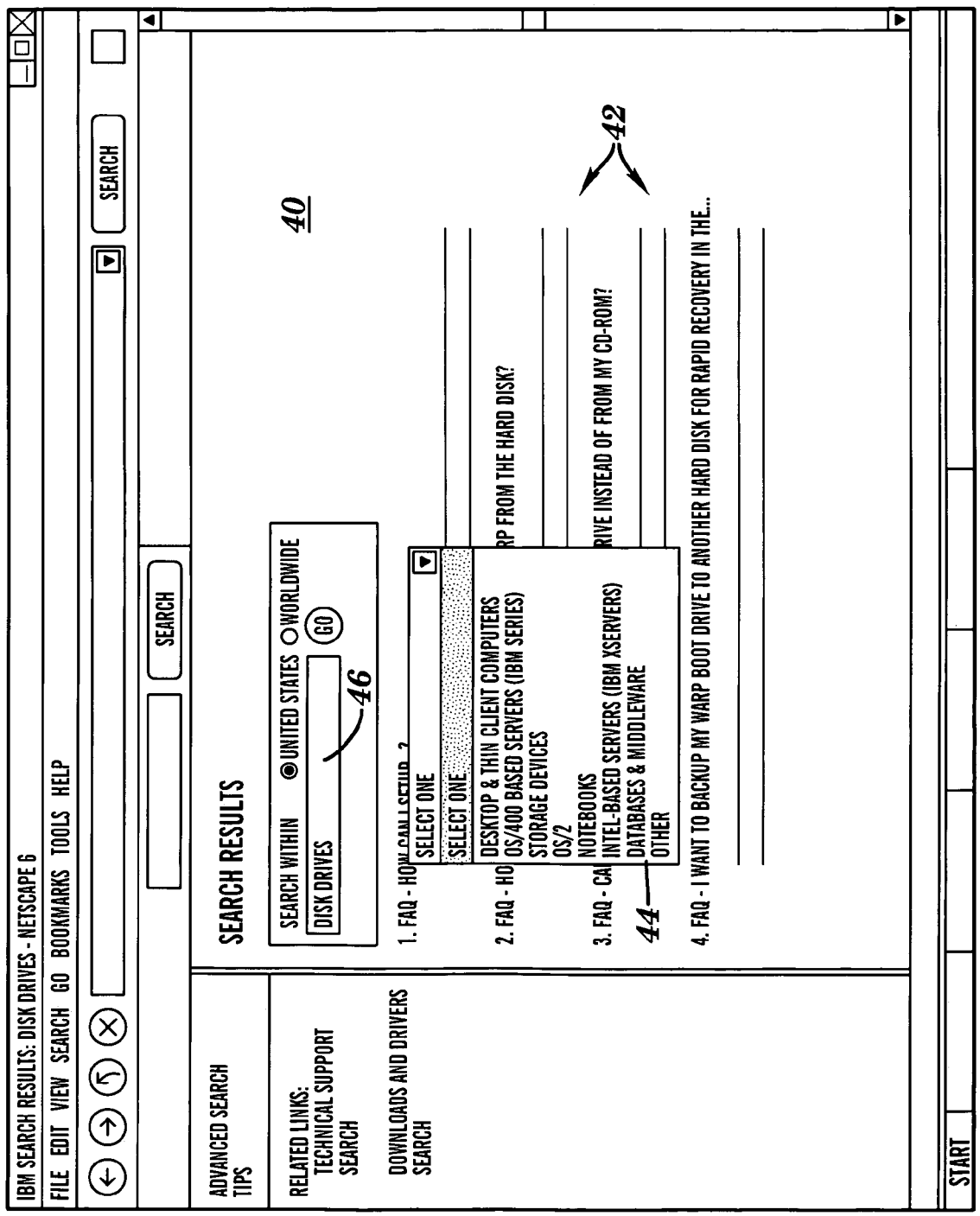
FIG. 2 depicts an exemplary screen shot of a set of search results and a set of refinement categories in accordance with the present invention.

FIG. 2 shows an exemplary screen shot of an interface 40 depicting these features. Interface 40 shows that for the inputted query "disk drives" 46, a list of disk drive related search results 42 and a set of refinement categories in a drop down dialog box 44 were returned. For this particular query, the search engine 12 located 113,453 documents. The end user is able to choose one of the refinement categories, e.g., "Notebooks" to further narrow the query, thereby reducing the number of located documents. When an end user chooses a refinement category, refinement analysis system 24 (FIG. 1) causes the original return set 34 to be filtered to include only documents pertaining to the chosen category (e.g., "Notebooks). Mechanisms for performing such a filtering operation are known in the art, and therefore are not discussed in further detail.

As noted above, the present invention addresses the problem of providing effective refinement categories 36 that will be of the most value to the end user. The search refinement system 10 of FIG. 1 depicts an exemplary embodiment for effectuating such results when query 30 is submitted to search engine 12. Search engine 12 may comprise any type of data searching system capable of locating results 14 based on some inputted criteria. Search engine 12 may reside locally as an integrated part of search refinement system 10, or as a remote application, e.g., accessible over the web, such as GOOGLE. Results 14 may typically comprise a list of documents and their location or address on a network. Results 14 may comprise any form of electronic information, including web pages or other mark-up language documents, database entries, files, documents or any other type of electronically stored data sets, etc.

Included with each of the results 14 may be some additional information, e.g., metadata that further describes something about the result. For instance, the metadata can be used to describe the subject matter, geography, industry, etc., of a located document. Moreover, the metadata can be organized into hierarchical taxonomies, such as: Universe/Milky way/Sol/Earth/North America/United States/New York/NYC.

In the exemplary embodiment depicted in FIG. 1, a Category Identifier System 16 examines the metadata contained in each result 14 and identifies or associates each of the results 14 to one or more corresponding hierarchical categories. In the above example, the identified category would be NYC, indicated as the most granular node in the hierarchy. It should be noted that there are no limitations to the number and/or size of the hierarchies that may be represented in the metadata. For instance, some hierarchies may have only a single node, while others may have hundreds or thousands. Moreover, some nodes may belong to multiple hierarchies.

In an alternative embodiment, where for instance metadata is not provided, hierarchical categories for each result could be identified using some means other than metadata. For instance, Category Identifier System 16 could assign categories based on an analysis of other data in a document, e.g., subject headings or the frequency of key words. An exemplary implementation of an automated categorization system is taught in U.S. Pat. No., 6,360,227, "System and Method for Generating Taxonomies With Applications to Content-Based Recommendations," issued to Aggrawal et al. on Mar. 19, 2002, which is hereby incorporated by reference. Regardless of how the categories are identified, each result 14 is assigned at least one corresponding hierarchical category.

After all of the results 14 are processed, Category Identifier System 16 outputs a list of identified categories 17 (i.e., all the identified categories for all of the results 14). The number of possible categories in the list of categories 17 is virtually unlimited and can for example range from one to many thousands. Because the list can be so expansive, it typically must be pared down to a manageable number that can be reasonably displayed for the user. Selection system 18 provides this function by analyzing the list of identified categories 17 and selecting a suitable set of refinement categories 36. To achieve this, selection system 18 includes a ranking system 20 and a category walk-up system 22, which help to identify the most appropriate refinement categories from the list of categories 17.

Ranking system 20 ranks each category in the list of categories 17. In one embodiment, categories are ranked based on frequency, i.e., by the number of times the category was identified by the Category Identifier System 16 as corresponding to results 14. In other words, ranking system 20 examines each category and determines how many results 14 belong to each category. Each category is then ranked, highest to lowest (i.e., "rank-ordered"). Other rankings could also be utilized, such as degree of match to a user-specific profile of interests, or position in a pre-specified ontology of subjects.

As a hypothetical example, assume search engine 12 returned 100,000 results, and Category Identifier System 16 identified a list of 200 categories for the 100,000 results. Because displaying 200 categories for the end user would be an impractical means for refining the search, a limited number of the 200 must be selected for display. Assume the 200 categories were ranked as follows, with the category "NYC" having the highest rank for being identified by 25,000 of the 100,000 search results:

| Rank | Category | Frequency |
|------|----------|-----------|
| 1 | NYC | 25000 |
| 2 | New York | 13000 |
| 3 | Entertainment | 8000 |
| 4 | Architecture | 7000 |
| 5 | Banking | 6500 |
| 6 | Museums | 5000 |
| 7 | Travel | 4800 |
| 8 | Import/Export | 4500 |
| ... | ... | ... |
| 199 | Monuments | 3 |
| 200 | Long Island | 2 |

From this ranking, selection system 18 would select an initial set of the N highest-ranking categories, where N is an arbitrary number of refinement categories suitable for display. Thus, for instance, if N were 6, then the initial set of categories would include NYC, New York, Entertainment, Architecture, Banking, and Museums. In one simple embodiment, these results could be provided as the final set of refinement categories 36. However, the present invention provides a category walk-up system 22 for further improving the results by examining hierarchical relationships among the categories.

In particular, once the initial set of categories is determined, category walk-up system 22 eliminates any categories from the initial set if the category has a hierarchical parent or ancestor in the initial set. That is, the hierarchy for each category is "walked up" to determine if a broader category exists in the initial set. In order to achieve this, the ancestral hierarchy for each identified category is made available, for instance by storing the ancestral hierarchy with the category itself, within the document, or by storing hierarchical information elsewhere within search refinement system 10. For instance, it was noted above that NYC was represented in within the metadata hierarchy: Universe/Milky way/Sol/Earth/North America/United States/New York/NYC. Accordingly, since NYC has a parent that is also in the initial set, i.e., New York, NYC would be eliminated from the initial set. Similarly, assuming that the category "Museums" existed in the hierarchy: Entertainment/Arts & Culture/Museums, Museums would likewise be eliminated since it has the ancestor (i.e., grandparent) Entertainment in the initial set.

It should be understood that any other type of elimination criterion could likewise be used to eliminate categories. For instance, the elimination criterion could be based on other hierarchical relationships between nodes of a taxonomy in the initial set of refinement categories. Alternatively, the elimination criterion could be based on a user profile of interests.

Once all categories having hierarchical ancestors are eliminated, then, for each one eliminated, a next highest ranking category from the list of categories 17 can be added to the initial set. For instance, in the above example, because two categories were eliminated, the next highest-ranking categories, Travel and Import/Export, would be added. The new set of refinement categories can again be checked for hierarchical ancestors, and the process of eliminating and adding categories could be repeated until no categories in the initial set have hierarchical ancestors.

Finally, after no further replacements are required, a supplementary category, e.g., "Others," can be appended to the list to create the final set of refinement categories 36. The category "Others" provides access to all other categories not listed in the set of refinement categories 36.

Provided below is an exemplary algorithm for implementing the present invention, including an algorithm for selecting categories when the supplementary category "Others" is chosen by the user.

I. Initial Selection of Categories by Frequency
 1. Decide how many categories are to be shown—denoted below as d.
 2. Sort the list of categories by frequency, order descending from largest frequency.
 3. If there are less than or equal to d categories go to step 8.
 4. Select the top d-1 categories.
 5. Remove all children (grandchildren, etc.) categories from the selection.
 6. If the current selection has d-1 categories proceed to next step. Otherwise add categories from the sorted list and go to step 5.
 7. Append a category called "Other".
 8. Display the selection.

II. Determining the categories in "Other"
 1. When the category of Other is selected, a new search is executed using the same query but with the previous list of categories and their children (grandchildren, etc.) excluded.
 2. Remove all the children (grandchildren, etc.) from the current category list.
 3. If the number of is less than d, go to step 6.
 4. Take the first category, add its parent if it is not the root node and remove the child from the current list, else:
 5. Remove all children from the whole list, go to step 3.
 6. Display the selection.

Obviously, numerous variations of the above algorithm could be utilized, and are believed to fall within the scope of the invention.

It is understood that the systems, functions, mechanisms, methods, and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention has been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

The invention claimed is:

1. A method executed by a computer for generating a set of categories in response to a search query, comprising:
 generating a plurality of search results in response to a query;
 identifying at least one category from a hierarchy of categories for each search result;
 rank-ordering each identified category in descending order based on a number of times the category was identified for the plurality of search results;
 selecting an initial set of refinement categories based on the rank-ordering of the identified categories, wherein the initial set of refinement categories contains a plurality of categories, and wherein the number of categories in the initial set of refinement categories is less than the total number of categories identified in the identifying step;
 eliminating all categories from the initial set of refinement categories that meet an elimination criterion, wherein the eliminating generates a resulting set of refinement categories, wherein the eliminating further includes eliminating all categories from the initial set of refinement categories that have a hierarchical ancestor in the initial set of refinement categories, wherein, after the eliminating step, generating a final set of refinement categories by adding a new category for each category eliminated during the eliminating step to the resulting set of refinement categories, and wherein the new category is a next highest-ranking category in the rank-ordering of the identified categories that was not in the initial set of refinement categories based on the rank-ordering of the identified categories;
 appending a supplementary category to the final set of refinement categories, wherein the supplementary category provides access to identified categories not in the final set of refinement categories, and wherein selection of the supplementary category causes a new search to be executed using the same search query but with the final set of refinement categories and their children and grandchildren excluded and removing all the children and grandchildren from a current category list; and
 displaying the final set of refinement categories and the supplementary category.

2. The method of claim 1, wherein the identifying step includes examining metadata in each search result.

3. The method of claim 1, wherein the initial set of refinement categories comprises a predetermined number of the most frequently identified categories.

4. The method of claim 1, further comprising providing an interface to allow an end user to select a category from the resulting set of refinement categories to narrow the search query.

5. The method of claim 1, wherein the elimination criterion eliminates categories that have a hierarchical parent in the set of refinement categories.

6. The method of claim 1, where the elimination criterion is based on hierarchical relationship between nodes of a taxonomy in the initial set of refinement categories.

7. The method of claim 1, wherein the elimination criterion is based on a user profile of interests.

8. The method of claim 1, wherein the identifying step includes using an automated categorization system to determine the category to which a document belongs.

* * * * *